June 16, 1925.
C. C. FARMER
RAIL SANDING DEVICE
Filed Jan. 6, 1923
1,541,934.
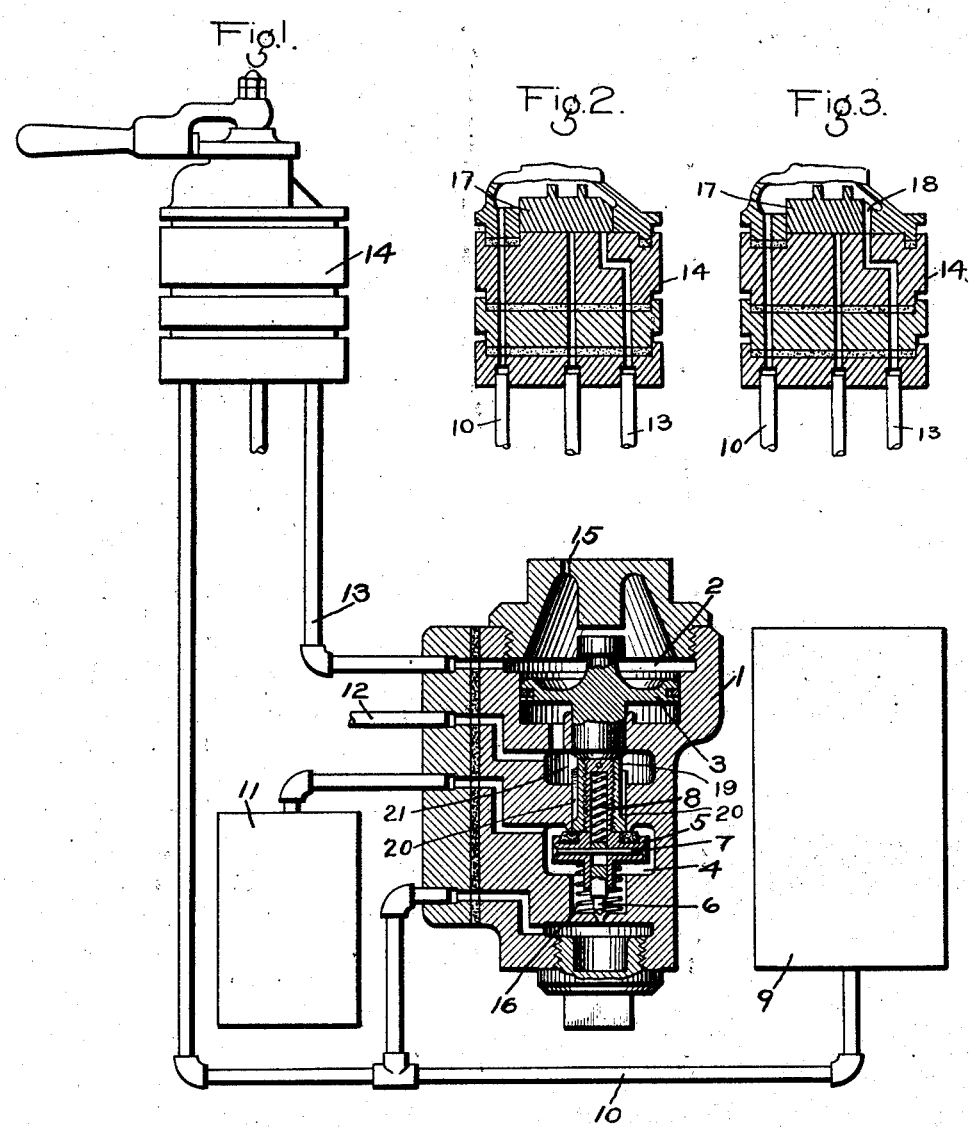
INVENTOR
CLYDE C. FARMER
BY *Wm. M. Cady*
ATTORNEY Patented June 16, 1925.

1,541,934

UNITED STATES PATENT OFFICE

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

RAIL-SANDING DEVICE.

Application filed January 6, 1923. Serial No. 611,099.

*To all whom it may concern:*

Be it known that I, CLYDE C. FARMER, a citizen of the United States, residing at Pittsburgh, in the county of Allegheny and State of Pennsylvania, have invented new and useful Improvements in Rail-Sanding Devices, of which the following is a specification.

This invention relates to a sanding device for controlling the supply of sand to railway rails in order to provide traction for the wheels of railway vehicles.

One object of my invention is to provide an improved fluid pressure operated valve device for controlling the supply of sand for sanding the rails.

Another object is to provide a fluid pressure operated sand valve device adapted to be controlled by the movement of an engineer's brake valve.

In the accompanying drawing, Fig. 1 is a diagrammatic view of an engineer's brake valve associated with a fluid pressure operated sanding valve device in accordance with my invention. Fig. 2 a sectional view of the brake valve device in a position other than emergency position; and Fig. 3 a sectional view of the brake valve device in emergency application position.

As shown in the drawing, the sand valve device may comprise a casing 1 having a piston chamber 2, containing a piston 3 and having a chamber 4 containing a valve 5 adapted to be operated by piston 3 and provided with a guide stem 19 having grooves 20 through which communication is established from valve chamber 4 to chamber 21 when valve 5 is off its seat. Mounted in a central bore of the valve 5 is a valve 6 having its stem slotted to receive a pin 7 and subject to the pressure of a coil spring 8. The valve 6 controls communication from the main reservoir 9 through pipe 10 to a sand reservoir 11 and valve 5 controls communication from the reservoir 11 to a pipe 12, through which fluid under pressure is supplied to effect the sanding of the railway rails in the well known manner heretofore employed but which is not shown, since the same forms no part of my present invention.

The piston chamber 2 is connected by a pipe 13 to an engineer's brake valve device 14 and said brake valve is provided with a rotary valve 17 having a port 18 adapted in the emergency application position of the brake valve device to supply fluid under pressure through pipe 13 to the piston chamber 2, as shown in Fig. 3, while in the other positions of the brake valve as shown in Fig. 2, the brake valve connection to the piston chamber 2 is blanked. A restricted port 15 opens from the piston chamber 2 to the atmosphere, so that when the brake valve is in a position other than emergency position, the piston chamber 2 will be vented to the atmosphere.

In operation, when the brake valve device is in any position except emergency application position, the brake valve connection to the piston chamber 2 is blanked and since piston chamber 2 is then open to the atmosphere by way of the restricted port 15, the valve 5 will be held to its seat by a spring 16. When valve 5 is seated, the valve 6 will be lifted from its seat by the pin 7, so that fluid under pressure will be supplied from the main reservoir 9 through pipe 10 to the sand reservoir 11, charging said reservoir with fluid under pressure at main reservoir pressure.

When the brake valve is turned to emergency application position, fluid under pressure is supplied by the brake valve to the piston chamber 2 at a much greater rate than it can escape through the restricted port 15, and piston 3 is thereby operated to lift the valve 5 from its seat, at the same time closing the valve 6. Fluid under pressure is then supplied from the sand reservoir 11 to the sand pipe 12 so as to effect the sanding of the rails. The sanding continues until the pressure in the reservoir 11 is exhausted.

When the brake valve is turned from emergency position, fluid is vented from piston chamber 2 through the restricted port 15 and the spring 16 then returns valve 5 to its seat and the valve 6 is lifted from its seat, so that the sand reservoir 11 is again charged with fluid under pressure from the main reservoir in readiness for another operation.

The arrangement of valve 6 with the slot and pin connection permits the unseating of valve 5 without driving the valve 6 to its seat with damaging force such as to injure same, since the spring 8 acts as a cushion for the valve 6 while it is moving to its seat.

Having now described my invention, what I claim as new and desire to secure by Letters Patent, is:—

1. The combination with a source of fluid under pressure and a reservoir, of a sand valve device comprising a valve for controlling the supply of fluid from said reservoir to effect the sanding of the rails, a valve for controlling the supply of fluid from said source of fluid under pressure to said reservoir, and a piston operated by fluid under pressure for operating said valves.

2. The combination with a source of fluid under pressure and a reservoir, of a sand valve device comprising a valve for controlling the supply of fluid from said reservoir to effect the sanding of the rails, a spring pressed valve mounted in said controlling valve for controlling the supply of fluid from said source of fluid under pressure to said reservoir, and a piston for operating said valve.

3. The combination with a source of fluid under pressure and a reservoir, of a valve for supplying fluid from said source to said reservoir, a valve for controlling the supply of fluid from said reservoir for effecting the sanding of the rails, and a piston operated by fluid under pressure for opening the first mentioned valve and for closing the second mentioned valve.

4. The combination with a brake valve device and a reservoir, of a valve device operated by fluid under pressure upon movement of said brake valve device to one position for supplying fluid under pressure from said reservoir to effect the sanding of the rails and operated by reduction in fluid pressure upon movement of the brake valve device to another position for supplying fluid under pressure to said reservoir.

5. The combination with a brake valve device and a reservoir normally charged with fluid under pressure, of a valve device operated by fluid under pressure supplied from the brake valve device in emergency application position for supplying fluid under pressure from said reservoir to effect the sanding of the rails and operated by reduction in fluid pressure upon movement of the brake valve device to another position for supplying fluid under pressure to said reservoir.

6. The combination with a brake valve device, a reservoir, and a source of fluid under pressure, of a valve device comprising a valve for controlling the supply of fluid from said source to said reservoir, a valve for controlling the supply of fluid from said reservoir to effect the sanding of the rails, and a piston operated by fluid under pressure supplied by the brake valve device in one position for operating said valves.

In testimony whereof I have hereunto set my hand.

CLYDE C. FARMER.